United States Patent [19]
Levine

[11] Patent Number: 5,123,046
[45] Date of Patent: Jun. 16, 1992

[54] VCR WITH CABLE TUNER CONTROL

[75] Inventor: Michael R. Levine, Boca Raton, Fla.

[73] Assignee: Smart VCR Limited Partnership, Ann Arbor, Mich.

[21] Appl. No.: 609,291

[22] Filed: Nov. 5, 1990

[51] Int. Cl.⁵ .................. H04N 7/167; H04H 1/02; H04B 10/04; H04B 10/06

[52] U.S. Cl. ........................... 380/10; 380/52; 358/194.1; 358/335; 340/825.72; 341/176; 455/151.2; 359/146

[58] Field of Search ............ 380/7, 10, 49, 52; 455/131, 151, 5, 6; 358/86, 349, 194.1, 335; 340/825.72; 341/176; 359/146

[56] References Cited

U.S. PATENT DOCUMENTS

| | | | |
|---|---|---|---|
| 4,631,601 | 12/1986 | Brugliera et al. | 455/131 X |
| 4,977,455 | 12/1990 | Young | 358/142 |
| 5,046,093 | 9/1991 | Wachob | 380/10 X |

OTHER PUBLICATIONS

"Interactive Videodisc Systems for Education", J. Bennion, E. Schneider, Journal of the Society of Motion Picture and Television Engineers, vol. 84, No. 12, Dec. 1975.
Cable data advertisement, Cablevision, Feb. 9, 1981.
DAP II advertisement, Nov.-Dec. 1981.

Primary Examiner—Bernarr E. Gregory
Attorney, Agent, or Firm—Krass & Young

[57] ABSTRACT

A video recorder, adapted to receive descrambled signals from a remotely controllable tuner/descrambler for multi-channel cable or satellite signals for recording or provision to a T.V. receiver, includes a future program memory which may be programmed by an operator to cause the system to record a predetermined channel at a predetermined future time. To ensure that the descrambler is tuned to the proper channel when a signal requiring descrambling is to be recorded, the video recorder is connected to a remote control transmitter which is energized at the time occurrence of a program to be recorded to send a signal to the remote control receiver of the tuner/descrambler causing it to select the appropriate channel for descrambling.

20 Claims, 1 Drawing Sheet

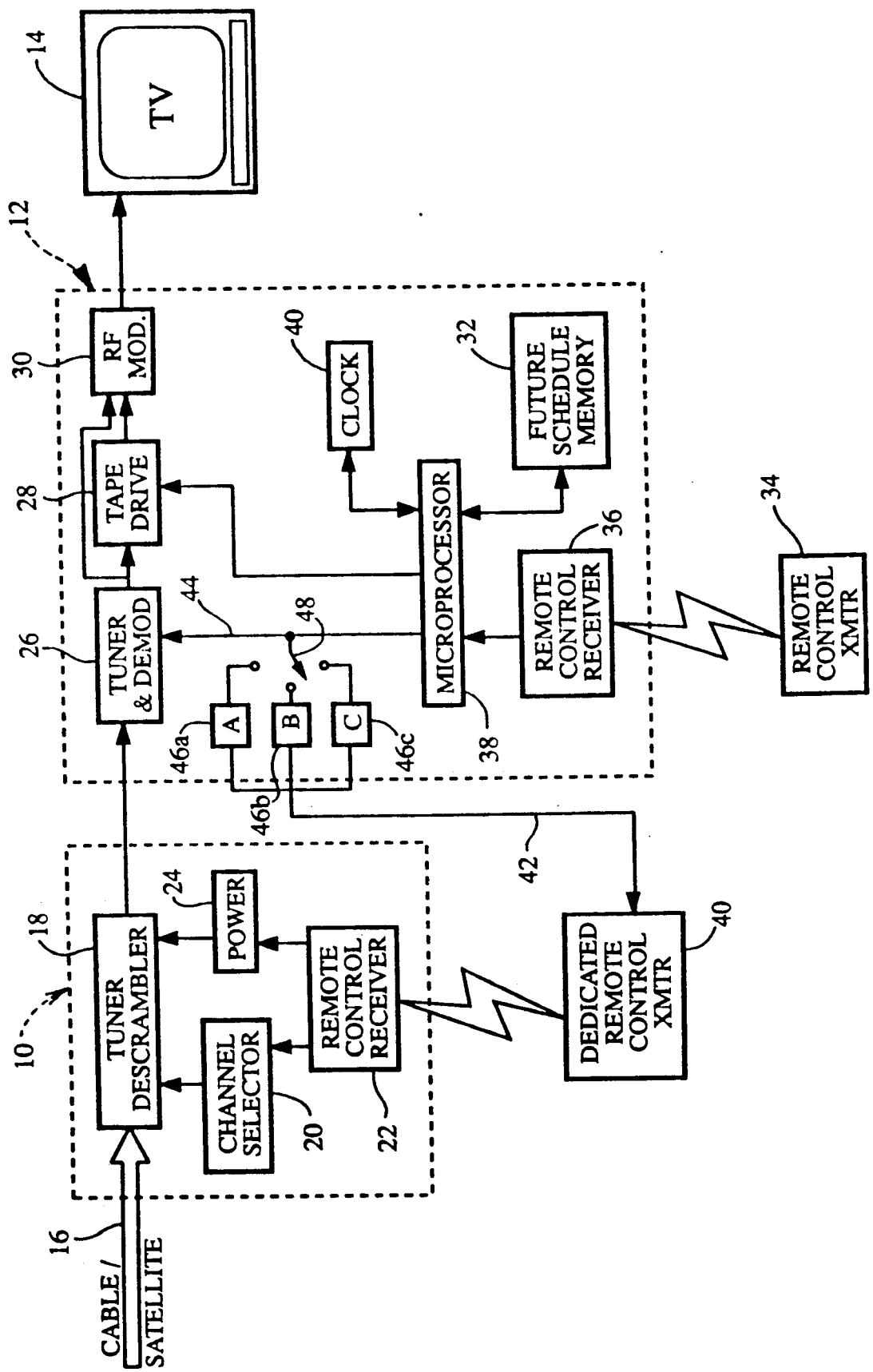

VCR WITH CABLE TUNER CONTROL

FIELD OF THE INVENTION

This invention relates to programmable systems for recording television signals provided to the system on multi-channel sources such as cable or satellite, in which at least certain of the channels require descrambling and more particularly to such a system in which the video recorder transmits a signal to the remote control receiver of a tuner/descrambler at the time of occurrence of a program to be recorded, to ensure that the tuner/descrambler is tuned to the channel it is desired to record.

BACKGROUND OF THE INVENTION

Most video recorders of the type intended to be used with television receivers include a system for enabling the automatic, unattended recording of programs scheduled for future transmission. In such systems the operator can load a future schedule memory with signals representing the channel, starting time and ending time (or alternatively duration) of one or more future occurring programs that it is desired to record. The system includes a real time clock and when a comparator determines that the present time has reached the starting time of a program to be recorded the tape drive is energized and the channel number stored in the memory is used to control the tuner of the video recorder. When the real time reaches the ending time of the program the recording process is terminated.

Often the source of signals for the video recorder constitutes either a cable or satellite multi-channel signal including one or more channels which are scrambled to prevent their reception by an unauthorized source. These signals must be descrambled before they can be recorded or displayed on the television receiver. Tuner/descramblers are typically employed for this purpose. Popularly called "cable boxes" these units receive the output of the cable and/or the satellite and may be tuned by the operator, typically employing an infrared remote control device, to a desired channel. The output of the channel box is provided to the video recorder and neither directly to the T.V. receiver or to the T.V. receiver via the video cassette recorder.

A variety of arrangements may be used to interconnect the tuner/descrambler, the video recorder and the T.V. receiver such as those disclosed in U.S. Pat. Nos. 4,630,133 and 4,771,456. Some of these systems allow one channel to be recorded while a different channel is displayed on the T.V. receiver.

In all of these systems the proper recording of a future scheduled television program occurring on one of the scrambled channels requires that the descrambler be tuned to the desired channel at the time of occurrence of the signal to be recorded. Often the future schedule memory is programmed a long time in advance of the time of occurrence of the program to be recorded. If the system is used for real time viewing or recording between the time of programming and the time of occurrence of the future program to be recorded, the channel selector the descrambler may have been adjusted to tune some channel other than the one that it is desired to record. The operator must then return the descrambler setting to the proper channel before recording for the system to operate properly. Particular difficulty is encountered when the schedule memory is programmed to record two future programs occurring on different scrambled channels. It is then necessary to adjust the scrambler setting after the occurrence of the first program before the occurrence of the second one.

SUMMARY OF THE INVENTION

The present invention is directed toward a system and method of operation which eliminates the need for the operator to ensure that the cable box is tuned to an appropriate channel at the time the signal occurring on that channel is to be recorded by providing means whereby the future schedule memory of the video recorder can exercise control over the channel to which the descrambler is tuned using the remote control receiver incorporated in the descrambler.

Broadly, the present invention provides a remote control transmitter which sends a signal to the remote control receiver of the cable box causing it to tune to the appropriate channel at the time the future schedule memory controls the system to record a program occurring on that channel. The video recorder system preferably includes a switch which allows the operator to select one of the several popular cable boxes so that the code transmitted to the cable box remote control receiver is appropriate to tune it to the channel dictated by the future schedule memory. The remote control transmitter may also send a signal to the cable box causing it to be energized if its power supply arrangement is such that it is not energized at all times or at least when the video cassette recorder is energized.

In a preferred embodiment of the invention the control that the video recorder exercises over energization and tuning of the cable box allows the use of a single remote control transmitter to control both the video recorder and the cable box, eliminating need for separate remote control transmitters for each.

The components which must be added to a conventional video recorder to enable use of the system of the present invention are relatively simply and inexpensive add substantially simplify the process of recording future scheduled programs and the overall operation of the system.

BRIEF DESCRIPTION OF THE DRAWINGS

These and other features of the present invention will be described in connection with the accompanying drawing which is a schematic diagram of the preferred embodiment of the invention.

DETAILED DESCRIPTION OF THE DRAWINGS

Referring to the drawing, the system of the present invention broadly employs a "cable box", generally indicated at 10, a video recorder, generally indicated at 12, and a television receiver 14. This system receives multiple television signals simultaneously over a wide band carrier 16 such as a community cable system or a broadcast satellite. The units are interconnected so as to allow a single television channel on the cable/satellite input 16 be tuned, descrambled if it constitutes a scrambled premium channel, and either recorded for future playback by the video recorder 12 or displayed on the television receiver 14.

The cable box 10, video recorder 12 and television receiver 14 can be interconnected in a variety of different manners including the arrangements illustrated in U.S. Pat. Nos. 4,771,456 or 4,630,133 and the present invention not be considered to be limited to the interconnection arrangement illustrated in the FIGURE.

The cable box 10 includes a tuner/descrambler 18 connected to receive the broad band input signal on line 16 and operative to tune and demodulate a single channel and use that signal to remodulate a locally generated radio frequency signal so as to provide the tuned signal on a single channel tunable by the television receiver 14. Typically channel box 10 will be switchable so as to provide an output on either of two adjacent television channels, so that the television receiver 14 may be tuned to whichever of the channels is not used by local television broadcast stations. The channel that unit 18 is tuned to is controlled by a channel selector 20 and if that channel is received in scrambled form, the unit 18 acts to descramble the signal. Typically, the channels will be scrambled if a premium charge is made for their reception.

Channel selector 20 may be typically controlled manually or by output signals from a remote control receiver 22. The remote control receiver may also control the power supply 24 for the cable box.

The output of the tuner/descrambler is provided to a tuner and demodulator unit 26 forming part of the video recorder 12. The unit 26 is normally adjustable so that it can receive any channel, but when it is used with a cable box 10 that provides output on a single channel, it must be adjusted to receive the channel which the cable box outputs. The output of the tuner/demodulator 26 is provided both to a tape drive unit 28 to allow recording of the output signal and to an RF modulator 30 providing output to the television receiver 14. The RF modulator is again tuned to a channel that is not used by a television broadcast station in the area. Television receiver 14 is normally tuned to the output channel of the modulator 30. The playback heads of the tape drive 28 are also connected to the RF modulator 30. The unit employs an internal switching system (not shown) so that the output of the tuner/demodulator 26 is provided to the modulator 30 except when the tape drive is in playback mode.

In order to allow the unattended recording of previously programmed television signals, a future schedule memory 32 may be loaded with digital signals representative of the channel and time of occurrence of the programs which the operator desires to record. The time of occurrence signals may take a variety of forms including start and end time of programs or start time and duration. The operator of the system will normally load signals into the future schedule memory using a remote control transmitter 34 which typically provides infrared control signals to a remote control receiver 36 forming part of the video recorder. Signals from the remote control receiver are provided to a microprocessor 38 that loads the signals into the future schedule memory 32.

A real time clock 40 is also connected to the microprocessor 38 which operates to compare present time signals with the times loaded in the future schedule memory for the recording of programs. When real time coincides with the time of occurrence of a program loaded in the future schedule memory 32, microprocessor sends signals to the tuner and demodulator 26 and to the tape drive 28 causing the proper channel to be tuned and recorded by the tape drive 28.

As heretofore described, the system is conventional and works properly as long as the tuner/descrambler 18 has been tuned to a channel stored in the future schedule memory 32 prior to time of occurrence of a particular program. With alternative connection arrangements in which the cable 16 is provided directly to the detuner/demodulator 26 of the video recorder, it is only necessary that the tuner/descrambler 18 forming part of the cable box is properly tuned when a premium channel requiring descrambling is to be recorded. In either arrangement, the failure to maintain the cable box tuned to the proper channel is one of the frequent reasons that the operator does not achieve recording of the desired program.

In order to obviate the possibility of recording the wrong channel because of the tuner/descrambler 18 being improperly tuned at the time of recording, the system of the present invention allows the video recorder to achieve control over the channel to which the unit 18 is tuned via a dedicated remote control transmitter 40. Transmitter 40 is permanently positioned relative to the cable box 10 so that its output signals are received by the remote control receiver 22. For example, the transmitter 40 may be taped to the cable box adjacent the remote control receiver 22. The remote control transmitter 40 is connected to the video recorder by a flexible cable 42 to allow this positioning. The remote control transmitter 40 is energized by signals outputted by the microprocessor 38 on line 44, representing the channel associated with a program stored for recording in the future schedule memory 32, generated at the time of occurrence of that program.

In order to allow the remote control transmitter 40 to be used with any of the several types of cable boxes which are in use, each of which may employ a different coding for channel selection, the video recorder 12 includes three decoders 46a, 46b and 46c which convert the channel selection output signals from the microprocessor into one of three formats, each for use with a different make of cable box 10. A manual selector switch 48 allows one of the three decoders 46a, 46b or 46c to be connected between the microprocessor 38 and the transmitter 40. The remote control transmitter 40 may also send signals to the remote control receiver 22 energizing the power supply 24 at the time of occurrence of a program to be recorded.

Since the only control signals for a cable box 10 constitute the power ON or OFF signal and the channel selection signal, this arrangement allows the remote control transmitter 34 for the video recorder 12 to also exercise full control over the cable box 10, thereby eliminating the need for the operator to employ two remote control transmitters for the two units. In this mode the microprocessor 38 would send appropriate channel and power signals to the dedicated remote control transmitter 40 whenever appropriately commanded by the remote control transmitter 34, independent of operation of the future schedule.

In use, the operator may use the remote control transmitter 34 in the manner of the prior art to load channel and time of occurrence of a desired program to be recorded in the future schedule memory 32. Until the time of occurrence of that program the system can be used in the normal manner and the tuner 18 of the cable box 10 can be tuned to any desired channel. When the real time as provided to the microprocessor 38 by the clock 40 coincides with the start time of a program loaded into the future schedule memory the microprocessor sends appropriate control signals to the transmitter 40 to cause tuner 18 to select the appropriate channel. The output signal of the tuner 18 is provided through the tuner and demodulator 26 of the video recorder 12 to the tape drive 28, which is also energized by the microprocessor 38, to record the selected program.

Having thus described my invention I claim:

1. In a video recorder including a future schedule memory adapted to store the channel and time of occurrence of programs desired to be recorded, the video recorder being adapted to receive television input signals from a multi-channel tuner/descrambler having a first remote control receiver for channel selection, the improvement comprising:

a first remote control transmitter forming a part of the video recorder and operative under control of signals stored in said future schedule memory of the video recorder, said first remote control transmitter being adapted to provide signals to said remote control receiver of the tuner/descrambler for channel selection at the time of occurrence of a program to be recorded to cause said tuner/descrambler to provide the video recorder with the appropriate television signal to be recorded;

a second remote control receiver forming part of the video recorder; and a second remote control transmitter for provision of signals to said second remote control receiver in order to allow remote control of the video recorder and of the multi-channel tuner/descrambler through signals provided by the second remote control transmitter to the video recorder and from the first remote control transmitter of the video recorder to the first remote control receiver, whereby a single remote control unit may be used to control both the video recorder and the multi-channel tuner/descrambler.

2. The video recorder to claim 1 wherein said first remote control transmitter controls the channel selection of the tuner/descrambler.

3. The video recorder of claim 1 wherein said first remote control transmitter controls the energization of the tuner/descrambler.

4. The video recorder of claim 1, wherein said first remote control transmitter is connected to the video recorder via a flexible cable, said first remote control transmitter being positioned properly with respect to said first remote control receiver of the multi-channel tuner/descrambler for receipt of said signals generated by said first remote control transmitter by said first remote control receiver.

5. The video recorder of claim 1 in which the first remote control receiver and the first remote control transmitter communicate via infrared signals.

6. A method of controlling a multi-channel tuner/descrambler for television signals having a remote control receiver for channel selection for recording future scheduled programs, said method comprising the steps of:

storing the channel and time of occurrence of future programs desired to be recorded in a future schedule memory;

providing remote control signals to the remote control receiver via a remote control transmitter when the current time coincides with said time of occurrence of future programs desired to be recorded.

recording the television signal output of the multi-channel tuner/descrambler via a video recorder when the current time coincides with said time of occurrence of future programs desired to be recorded;

controlling operation of the video recorder via a second remote control receiver disposed in the video recorder; and providing second remote control signals to the second remote control receiver via a second remote control transmitter, whereby both the multi-channel tuner/descrambler and the video recorder may be controlled by the second remote control transmitter.

7. The method claimed in claim 6, wherein:

said step of providing remote control signals to the remote control receiver via a remote control transmitter includes providing remote control signals for selection of the channel tuned by the multi-channel tuner/descrambler.

8. The method claimed in claim 6, wherein:

said step of providing remote control signals to the remote control receiver via a remote control transmitter includes providing remote control signals for energization of the multi-channel tuner/descrambler.

9. The method claimed in claim 6, wherein:

said step of providing remote control signals to the remote control receiver via a remote control transmitter includes connecting said remote control transmitter to said future schedule memory via a flexible cable, and disposing said remote control transmitter proximate the remote control receiver.

10. The method claimed in claim 6, wherein:

said step of providing remote control signals to the remote control receiver via a remote control transmitter includes generating infrared signals via said remote control transmitter.

11. A video system comprising:

a multi-channel source of television signals;

a multi-channel tuner connected to said multi-channel source of television signals having a remote control receiver for channel selection based upon received remote control signals;

a video recorder connected to said multi-channel tuner having means operative to generate a signal specifying a channel selection; and a remote control transmitter operative to receive said signal specifying a channel selection generated by said video recorder and operative to generate remote control signals corresponding to said channel selection for receipt by said remote control receiver of said multi-channel tuner for channel selection.

12. The video system of claim 11, wherein:

said multi-channel source of television signals includes a television cable including at least one scrambled channel;

said multi-channel tuner consists of a cable box adapted to receive a selected channel from said television cable corresponding to received remote control signals, descramble the television signal on said selected channel if said selected channel is one of said at least one scrambled channel, and output the television signals of said selected channel on a predetermined channel.

13. The video system of claim 11, wherein:

said video recorder further includes a second remote control receiver for control of video recorder functions, and means for generating remote control signals via said remote control transmitter for channel selection corresponding to remote control signals received via said second remote control receiver; and said video system further includes a second remote control transmitter operative to generate remote control signals for receipt by said second remote control receiver of said video recorder for control of video recorder functions, whereby said second remote control transmitter may be used to control both said video recorder and said multi-channel tuner.

14. The video system of claim 13, wherein:
said second remote control transmitter includes means for providing channel selection signals; and
said remote control transmitter controls the channel selection of said multi-channel tuner corresponding to channel selection signals provided by said second remote control transmitter.

15. The video system of claim 13, wherein:
said second remote control transmitter includes means for providing energization signals; and
said remote control transmitter controls the energization of said multi-channel tuner corresponding to energization signals provided by said second remote control transmitter.

16. The video system of claim 11, wherein:
said video recorder further includes
a future schedule memory adapted to store the channel and time of occurrence of future programs,
a real time clock circuit for generating present time signals,
a controller connected to said future schedule memory, said clock circuit, and said remote control transmitter, said controller operative to control said remote control transmitter to transmit remote control signals to the remote control receiver of the multi-channel tuner for selection of the channel stored in said future program memory when said present time clock signal coincides with the time of occurrence of the future program.

17. The video system of claim 16, wherein: said video recorder further includes
a tape drive unit adapted to record television signals on a video tape and play back television signals previously recorded on video tape, and wherein
said future schedule memory stores the channel and time of occurrence of future programs desired to be recorded, and
said controller is further connected to said tape drive unit to control said tape drive unit to record the television signal received from the multi-channel tuner when said present time clock signal coincides with the time of occurrence of a future program to be recorded.

18. The video system of claim 11, wherein:
said remote control transmitter is connected to the video recorder via a flexible cable, said remote control transmitter being positioned properly with respect to said remote control receiver of the multi-channel tuner for receipt of said remote control signals generated by said remote control transmitter by said remote control receiver.

19. A video recorder adapted to receive television input signals from a multi-channel tuner/descrambler which has a remote control receiver for channel selection, said video recorder comprising:
a future schedule memory adapted to store the channel and time of occurrence of future programs to be recorded;
a clock circuit for generating present time clock signals;
a tape drive unit adapted to record television signals on video tape and play back television signals previously recorded on video tape;
a remote control transmitter operative to generate remote control signals for receipt by the remote control receiver of the tuner/descrambler for channel selection;
a controller connected to said future schedule memory, said clock circuit, said tape drive unit and said remote control transmitter, said controller operative to
control said remote control transmitter to transmit remote control signals to the remote control receiver of the multi-channel tuner/descrambler for selection of the channel to be recorded stored in said future program memory when said present time clock signal coincides with the time of occurrence of a future program to be recorded, and
control said tape drive unit to record the television signal received from the multi-channel tuner/descrambler when said present time clock signal coincides with the time of occurrence of a future program to be recorded.

20. The video recorder of claim 19, further comprising:
a second remote control receiver for receipt of second remote control signals;
said controller being further connected to said second remote control receiver and further operative to
control video recorder functions in accordance with received second remote control signals, and
generate remote control signals via said remote control transmitter for channel selection corresponding to second remote control signals received via as second remote control receiver; and
further comprising a second remote control transmitter separated from said video recorder for provision of signals to said second remote control receiver in order to allow remote control of the video recorder and of the multi-channel tuner/descrambler through signals provided by the second remote control transmitter to the video recorder and from the remote control transmitter of the video recorder to the remote control receiver, whereby said second remote control unit may be used to control both the video recorder and the multi-channel tuner/descrambler.

* * * * *